(12) United States Patent  
Shigeta (10) Patent No.: US 10,399,604 B2  
(45) Date of Patent: Sep. 3, 2019

(54) VEHICLE REAR STRUCTURE

(71) Applicant: TOYOTA JIDOSHA KABUSHIKI KAISHA, Toyota-shi (JP)

(72) Inventor: Daisuke Shigeta, Okazaki (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 15/922,941

(22) Filed: Mar. 16, 2018

(65) Prior Publication Data

US 2018/0273107 A1 Sep. 27, 2018

(30) Foreign Application Priority Data

Mar. 21, 2017 (JP) .................................. 2017-054598

(51) Int. Cl.
| | |
|---|---|
| *B62D 25/08* | (2006.01) |
| *B62D 27/02* | (2006.01) |
| *B62D 25/20* | (2006.01) |
| *B62D 21/02* | (2006.01) |

(52) U.S. Cl.
CPC ............ *B62D 25/08* (2013.01); *B62D 21/02* (2013.01); *B62D 25/2027* (2013.01); *B62D 27/023* (2013.01)

(58) Field of Classification Search
CPC .... B62D 25/08; B62D 21/02; B62D 25/2027; B62D 27/023
USPC .................................................. 296/193.08
See application file for complete search history.

(56) References Cited

U.S. PATENT DOCUMENTS

| | | | |
|---|---|---|---|
| 7,347,475 B2* | 3/2008 | Ikemoto .............. | B62D 25/087 296/193.08 |
| 8,888,157 B2* | 11/2014 | Narahara ........... | B62D 25/2027 296/1.08 |
| 2009/0085380 A1* | 4/2009 | Sakamoto ............. | B62D 21/15 296/193.08 |

FOREIGN PATENT DOCUMENTS

| | | |
|---|---|---|
| JP | 2007-99031 | 4/2007 |
| JP | 2014-113922 | 6/2014 |

* cited by examiner

*Primary Examiner* — Joseph D. Pape  
(74) *Attorney, Agent, or Firm* — Oblon, McClelland, Maier & Neustadt, L.L.P.

(57) ABSTRACT

A projection portion projecting in the same direction as an offset portion is provided between a welding-spot portion and a joining portion joined to a rear side member in a lower back panel. Accordingly, when a tensile force directed outwardly in the vehicle width direction is applied to the lower back panel, the projection portion is extended by the tensile force thus applied and is displaced toward the opposite side of the projecting direction of the projection portion, that is, toward the opposite side of the offset direction. Hereby, a stress applied to the welding-spot portion in an inclined wall portion can be reduced. This makes it possible to restrain weight and cost and to also restrain stresses applied to the welding-spot portion from the lower back panel and a rear floor pan when a load is input from a towing hitch member.

4 Claims, 8 Drawing Sheets

VEHICLE REAR STRUCTURE

INCORPORATION BY REFERENCE

The disclosure of Japanese Patent Application No. 2017-054598 filed on Mar. 21, 2017 including the specification, drawings and abstract is incorporated herein by reference in its entirety.

BACKGROUND

1. Technical Field

The present disclosure relates to a vehicle rear structure.

2. Description of Related Art

Japanese Unexamined Patent Application Publication No. 2007-99031 (JP 2007-99031 A) describes a towing hitch member. In the towing hitch member, a hitch member main body provided on the vehicle rear side and extending in the vehicle width direction is fixed to a vehicle body via a first connecting member, a second connecting member, and a third connecting member. More specifically, the first connecting member is fixed to a rear side member, the second connecting member is fixed to a side member outer, and the third connecting member is fixed to a lower back panel. Hereby, a load input into the hitch member main body at the time of towing using the towing hitch member is dispersedly transmitted to the rear side member, the side member outer, and the lower back panel.

SUMMARY

However, in the towing hitch member described in JP 2007-99031 A, the hitch member main body is fixed to the vehicle body via the first connecting member, the second connecting member, and the third connecting member. This accordingly increases the number of components, thereby causing an increase in weight and cost. Accordingly, it is desirable to reduce the number of connecting members.

In the meantime, in a case where the number of connecting members is reduced, it is desirable to fix a connecting member to a rear side member as a vehicle frame member. In this case, when a load directed downward in the vehicle up-down direction is input into a hitch member main body from an object to be towed, the load is transmitted to the rear side member via the connecting member. Hereby, a rotational moment that displaces an inner portion of the rear side member in the vehicle width direction to downward in the vehicle up-down direction around the rear side member is applied to a vehicle body. At this time, a tensile force that acts outward in the vehicle width direction is applied to the lower end of a lower back panel. The rear end of a floor pan molded by deep draw forming is joined to the lower back panel so as to form a housing portion for a spare tire, and it is necessary to provide a flange for joining to the lower back panel in the rear end of the floor pan. In order to form the flange, the rear end of the deep drawing portion of the floor pan has to be offset in the vehicle front-rear direction with respect to the rear ends of other parts of the floor pan at the time of molding. This also requires that a part of the lower back panel is offset in the vehicle front-rear direction so as to correspond to the part thus offset. Accordingly, when a tensile force is applied to the lower end of the lower back panel, the lower back panel might greatly deform such that the part offset in the vehicle front-rear direction in the lower back panel is extended. On this account, a large stress might be generated in a welding-spot portion where the lower back panel is joined to the floor pan. In this regard, there is still room for improvement in the related art.

The present disclosure restrains weight and cost and also restrains a stress to be applied to a welding-spot portion between a lower back panel and a rear floor pan at the time when a load is input from a towing hitch member.

An aspect of the present disclosure is related to a vehicle rear structure. The vehicle rear structure includes a projection portion and a lower back panel joined to a rear end of a rear floor pan provided in a vehicle rear portion and rear ends of a pair of rear side members. Each of the rear side members is attached to a corresponding one of two ends of the rear floor pan in a vehicle width direction. The lower back panel has: a through-hole into which a connecting member of a towing hitch member is able to be inserted, the towing hitch member being attached to the rear side members; a first offset portion formed inwardly in the vehicle width direction from the rear side members and offset toward an offset side, the offset side being one side in a vehicle front-rear direction; an inclined wall portion formed inwardly in the vehicle width direction compared with a corresponding one of the rear side members, the inclined wall portion being configured to connect the first offset portion to a general part, the general part being a part other than the first offset portion and the inclined wall portion in the lower back panel; and a welding-spot portion provided in the inclined wall portion, the welding-spot portion being welded to a part of the rear end of the rear floor pan. The projection portion is provided between the welding-spot portion and a joining portion of the lower back panel. The projection portion projects towards the offset side. The joining portion is a part where the lower back panel is joined to one of the rear side members.

In the vehicle rear structure according to the above aspect, the first offset portion may be offset toward the offset side so as to correspond to a second offset portion which is offset toward the offset side. The second offset portion may be a part of the rear end of the rear floor pan, which is offset toward the offset side.

In the above aspect, the lower back panel is joined to the rear end of the rear floor pan provided in the vehicle rear portion and the rear ends of the right and left rear side members each attached to a corresponding one of the two ends of the rear floor pan in the vehicle width direction. Further, the lower back panel includes: the through-holes into which the connecting members of the towing hitch member to be attached to the rear side members are insertable; the offset portion formed inwardly in the vehicle width direction from the rear side members so as to be offset toward one side in the vehicle front-rear direction in the rear end of the rear floor pan; and the inclined wall portion formed inwardly in the vehicle width direction from a corresponding one of the rear side members so as to connect the offset portion to a part other than the offset portion. The offset portion projects in the same direction as a part of the rear end of the rear floor pan, the part being offset toward the one side in the vehicle front-rear direction. Further, the inclined wall portion is provided with the welding-spot portion to which the rear end of the rear floor pan is partially welded.

Here, when the towing hitch member is attached to the rear side member and a load directed downward in the vehicle up-down direction is input into the towing hitch member from an object to be towed, a rotational moment that displaces the inner portion of the rear side member in the vehicle width direction to the lower side in the vehicle up-down direction around the rear side member is applied. When the rotational moment is applied to the vehicle body, a tensile force directed outwardly in the vehicle width direction is applied to the lower end of the lower back panel. When the lower back panel is extended by the tensile force, the offset portion is displaced to the opposite side from the offset direction and a part other than the offset portion is displaced toward the offset direction, so that a stress concentrates on the welding-spot portion in the inclined wall portion. However, the projection portion projecting in the same direction as the offset portion is provided between the welding-spot portion and the joining portion joined to the rear side member in the lower back panel of the present disclosure. Accordingly, when the tensile force is applied to the lower back panel, the projection portion is extended by the tensile force thus applied and displaced toward the opposite side from the projecting direction, that is, toward the opposite side from the offset direction, so that the displacement of the part other than the offset portion toward the offset direction is generally canceled. With the vehicle rear structure according to the above aspect, the deformation of the whole lower back panel in the vehicle front-rear direction is restrained, so that a stress toward the offset direction to be applied to the welding-spot portion in the inclined wall portion can be reduced.

According to the aspect above, with the vehicle rear structure according to the present disclosure, weight and cost of the vehicle structure can be restrained and a stress applied to the welding-spot portion between the lower back panel and the rear floor pan at the time when a load is input from the towing hitch member can be also restrained.

In the vehicle rear structure according to the above aspect, the projection portion may be provided at a position including a part of a lower edge of the lower back panel.

In the above aspect, the projection portion is provided at a position including a part of the lower edge of the lower back panel. That is, the projection portion is provided in the lower edge of the lower back panel on which the tensile force directed outwardly in the vehicle width direction acts most when a load directed downwardly in the vehicle up-down direction is input into the towing hitch member from an object to be towed. Accordingly, with the vehicle rear structure according to the above aspect, a stress toward the offset direction concentrates more on the welding-spot portion in the inclined wall portion near the lower edge of the lower back panel in comparison with a part other than the welding-spot portion, but it is possible to more surely reduce the stress directed toward the offset direction and applied to the welding-spot portion near the lower edge of the lower back panel due to the displacement of the projection portion provided at the position including a part of the lower edge of the lower back panel.

According to the aspect above, with the vehicle rear structure according to the present disclosure, a stress applied to the welding-spot portion between the lower back panel and the rear floor pan at the time when a load is input from the towing hitch member can be further restrained.

In the vehicle rear structure according to the above aspect, the projection portion may have a generally trapezoidal shape increased in width toward a lower side in a vehicle up-down direction. A lower end of the projection portion may be placed to be lower than the joining portion in the vehicle up-down direction.

In the above aspect, the projection portion has a generally trapezoidal shape increased in width toward the lower side in the vehicle up-down direction in a vehicle rear view, and the lower end of the projection portion is formed to include a region which is lower than the joining portion between the lower back panel and the rear side member in the vehicle up-down direction. That is, the upper end of the projection portion is placed between the welding-spot portion of the inclined wall portion and the joining portion joined to the rear side member in the lower back panel and the lower end of the projection portion is formed to include the region which is lower than the joining portion joined to the rear side member in the vehicle up-down direction, thereby making it possible to increase a region where the projection portion is formed. Accordingly, a range where the projection portion is displaced by the tensile force to be applied thereto toward the opposite side from the projecting direction, that is, toward the opposite side from the offset direction can be made large. Thus, with the vehicle rear structure according to the above aspect, it is possible to reduce the stress toward the offset direction to be applied to the welding-spot portion in the lower back panel in a wide range.

According to the aspect above, with the vehicle rear structure according to the present disclosure, the stress applied to the welding-spot portion between the lower back panel and the rear floor pan at the time when a load is input from the towing hitch member can be restrained in a wide range.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

With reference to FIGS. 1 to 9, the following describes one embodiment of the present disclosure. In the drawings, an arrow "FR" indicative of the front side in the vehicle front-rear direction, an arrow "OUT" indicative of the outside in the vehicle width direction, and an arrow "UP" indicative of the upper side in the vehicle up-down direction are illustrated.

Figure 1:
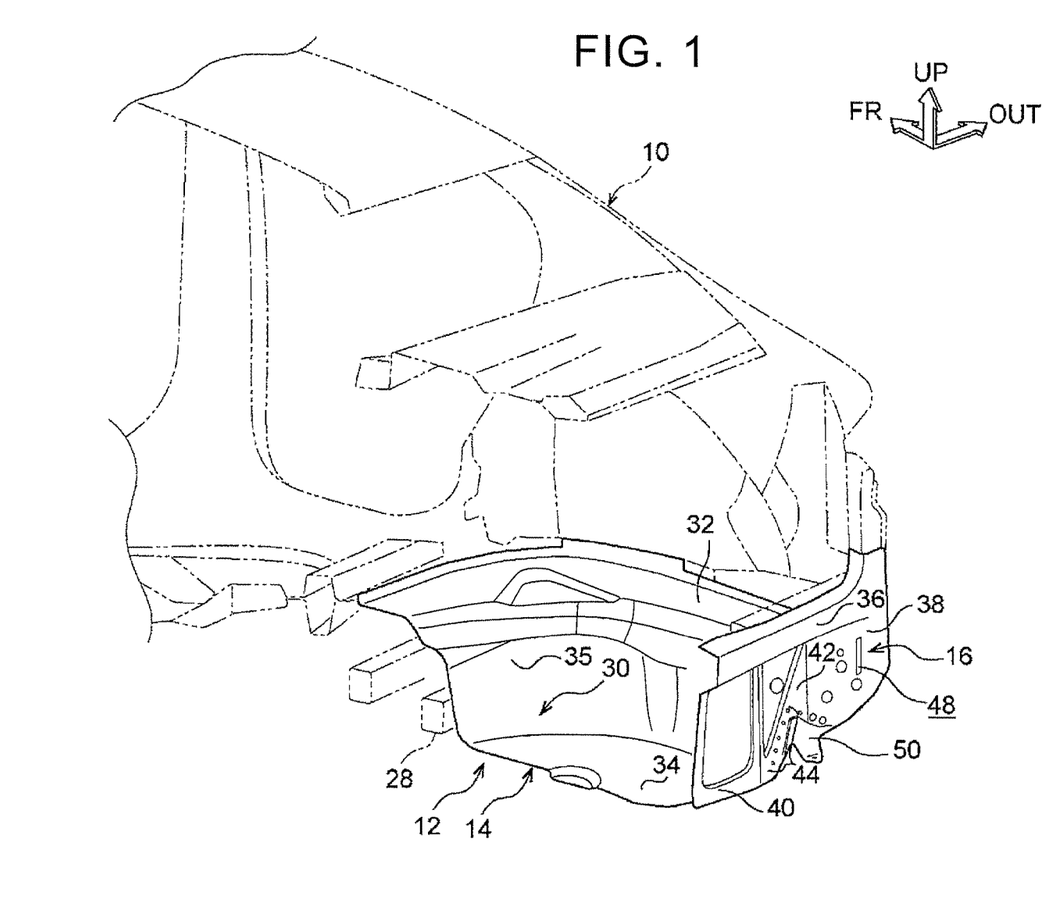
FIG. 1 is a sectional perspective view illustrating a vehicle rear portion having a vehicle rear structure according to one embodiment.
Figure 2:
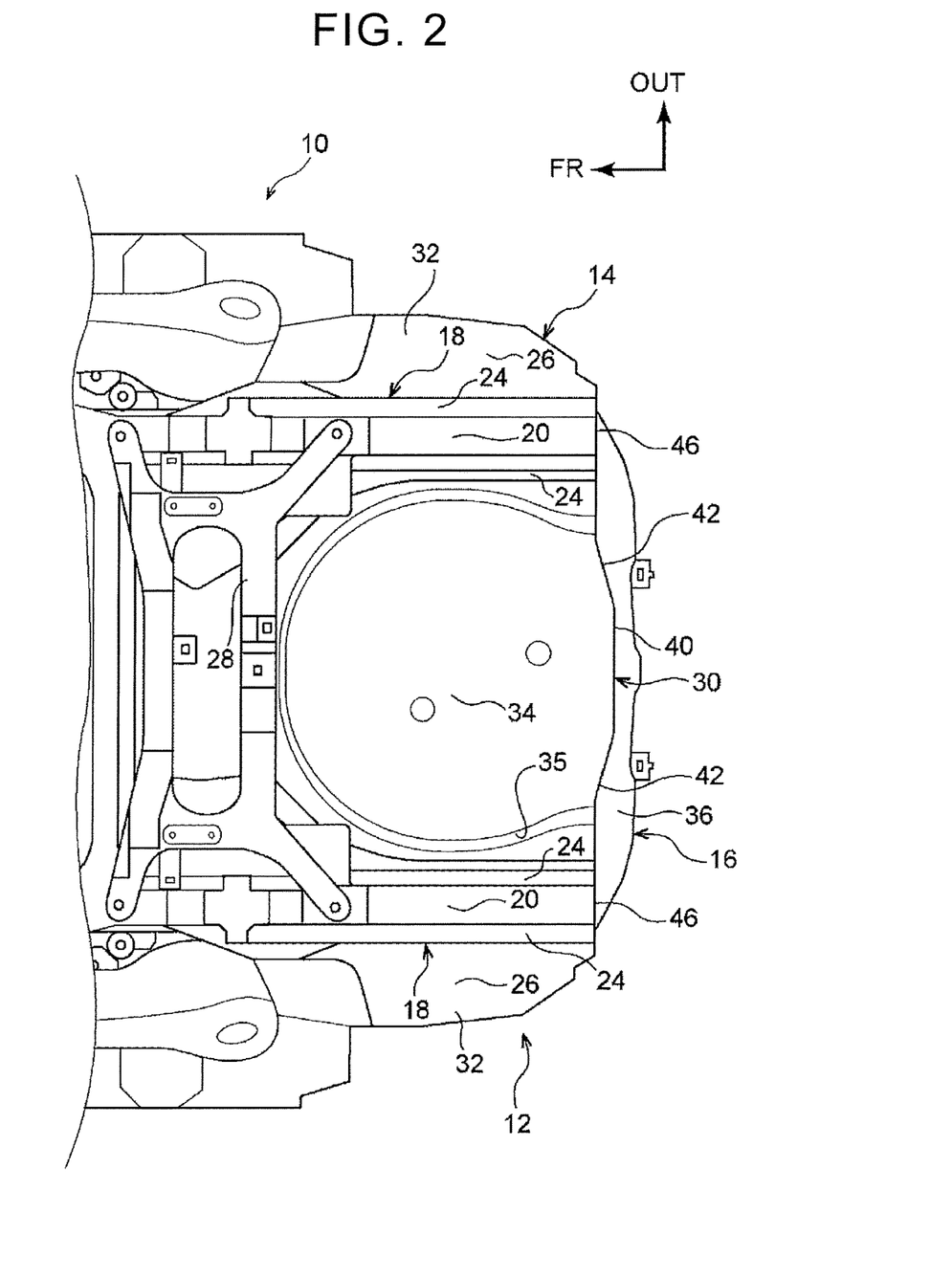
FIG. 2 is a plan view illustrating the vehicle rear portion having the vehicle rear structure according to the embodiment when viewed from the vehicle lower side.

As illustrated in FIG. 1, a rear underbody 12 of a vehicle 10 includes a rear floor pan 14 and a lower back panel 16. As illustrated in FIG. 2, a pair of right and left rear side members 18 constituting a part of the framework of the rear underbody 12 is provided below the rear floor pan 14 in the vehicle up-down direction, such that each of the rear side members 18 is provided in a corresponding one of the two ends of the rear floor pan 14 in the vehicle width direction. The rear side member 18 is a member having an elongated shape extending such that its longitudinal direction is along the vehicle front-rear direction. The rear side member 18 is constituted by a bottom wall portion 20 with the plate-thickness direction being generally along the vehicle up-down direction, a pair of right and left side wall portions 22 (see FIG. 8) each extending generally upward in the vehicle up-down direction from a corresponding one of the two ends of the bottom wall portion 20 in the vehicle width direction, and a pair of right and left flange portions 24 each having a plate-thickness direction generally along the vehicle up-down direction and extending from the upper end of a corresponding one of the side wall portions 22 such that the flange portions 24 extend in respective directions distanced from each other. Thus, the sectional shape of the rear side member 18, perpendicular to the longitudinal direction, has a hat shape opened upward in the vehicle up-down direction. The right and left flange portions 24 of the rear side member 18 are joined to a lower face 26 of the rear floor pan 14 in the vehicle up-down direction.

A rear end of a rear suspension member 28 configured to support a pair of right and left rear suspensions (not shown) is attached to the front portion of the rear side member 18 in the vehicle front-rear direction. Further, a flange 19 (see FIG. 5) with the plate-thickness direction being generally along the vehicle front-rear direction is formed in the rear end of the rear side member 18.

The rear floor pan 14 is a plate-shaped member having a generally rectangular shape with the plate-thickness direction being generally along the vehicle up-down direction in a plan view of the vehicle. The rear floor pan 14 includes a spare-tire housing portion 30 formed generally in the center in the vehicle width direction by deep draw forming. The spare-tire housing portion 30 is constituted by a floor pan bottom wall portion 34 placed below a general portion 32 of the rear floor pan 14 in the vehicle up-down direction, and a floor pan side wall portion 35 configured to connect the floor pan bottom wall portion 34 with the general portion 32. Note that the floor pan side wall portion 35 is integrally provided in the floor pan bottom wall portion 34 except a rear part thereof in the vehicle front-rear direction. That is, the spare-tire housing portion 30 is opened upward in the vehicle up-down direction and rearward in the vehicle front-rear direction.

A flange (not shown) standing upward in the vehicle up-down direction is formed in the rear end of the rear floor pan 14. The flange is joined to the lower back panel 16. Further, the rear end of the floor pan bottom wall portion 34 in the rear floor pan 14 is offset rearward in the vehicle front-rear direction from the rear end of the general portion 32 in the rear floor pan 14 so that the flange in the rear end does not break at the time of deep draw forming.

Figure 5:
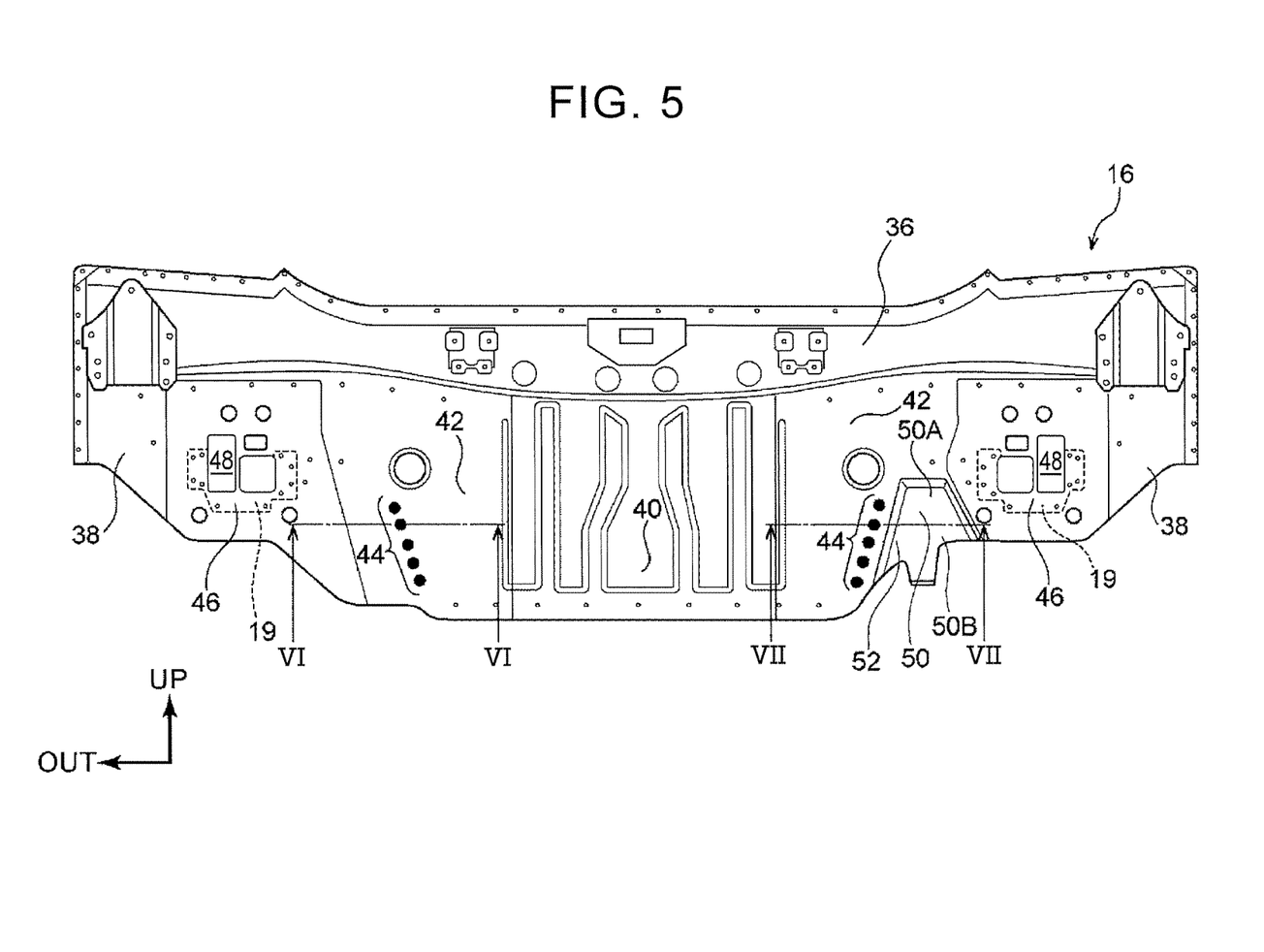
FIG. 5 is a rear view illustrating a lower back panel having the vehicle rear structure according to the embodiment when viewed from the vehicle rear side.

As illustrated in FIG. 5, the lower back panel 16 is formed generally in a rectangular plate shape in a rear view of the vehicle. A projecting portion 36 projecting rearward in the vehicle front-rear direction is formed on the upper side of the lower back panel 16 in the vehicle up-down direction so as to extend generally along the vehicle width direction. Further, the lower side of the lower back panel 16 in the vehicle up-down direction includes an offset portion 40 offset rearward in the vehicle front-rear direction from general surfaces 38 of the lower back panel 16 so as to correspond to the rear end of the floor pan bottom wall portion 34 of the rear floor pan 14, and a pair of right and left inclined wall portions 42 configured to connect the offset portion 40 to the general surfaces 38 and inclined forward in the vehicle front-rear direction as the inclined wall portions 42 extends toward the outside in the vehicle width direction. Note that the offset portion 40 in the lower back panel 16 is formed inwardly in the vehicle width direction compared with the rear side members 18 (see FIG. 2).

The lower end of the offset portion 40 in the lower back panel 16 is spot-welded to the flange of the rear end in the floor pan bottom wall portion 34 of the rear floor pan 14. Further, each of the right and left inclined wall portions 42 of the lower back panel 16 is provided with a welding-spot portion 44 provided close to a part other than the offset portion 40, that is, provided closer to the general surface 38 (a part placed outwardly in the vehicle width direction compared with the center of the inclined wall portion 42 in the vehicle width direction). The welding-spot portion 44 is spot-welded to the flange of the rear end in the floor pan side wall portion 35 of the rear floor pan 14. The welding-spot portion 44 is constituted by a plurality of spot welding-spots and is inclined upward in the vehicle up-down direction as the welding-spot portion 44 extending toward the outside in the vehicle width direction.

Each of the general surfaces 38 of the lower back panel 16 is provided with a joining portion 46 spot-welded to the flange 19 in the rear end of a corresponding one of the right and left rear side members 18 (also see FIG. 2). The joining portion 46 is placed generally in the center of the general surface 38 in the vehicle up-down direction. Further, the joining portion 46 has a through-hole 48 penetrating therethrough in the plate-thickness direction of the lower back panel 16. More specifically, the through-hole 48 having a generally rectangular shape with the longitudinal direction being along the vehicle up-down direction is formed in the lower back panel 16 at a position corresponding to a part between the right and left side wall portions 22 (see FIG. 8) of the rear side member 18.

The lower back panel 16 includes a pair of right and left projection portions 50 projecting rearward in the vehicle front-rear direction. Each of the projection portions 50 is formed in a corresponding one of the inclined wall portions 42 so as to be placed between the welding-spot portion 44 and the joining portion 46 to which the rear side member 18 is joined (note that FIG. 5 illustrates a state where the projection portion 50 is provided only on the right side of the lower back panel 16 so as to clearly distinguish a state where the projection portion 50 is provided from a state where the projection portion 50 is not provided). The projection portion 50 is formed generally in a trapezoidal shape in a rear view of the vehicle. The upper end of the projection portion 50 is placed between the welding-spot portion 44 in the inclined wall portion 42 and the joining portion 46 of the general surface 38 to which the rear side member 18 is joined, and the lower end of the projection portion 50 is placed between the welding-spot portion 44 in the inclined wall portion 42 and a region which is lower than the joining portion 46 of the general surface 38 to which the rear side member 18 is joined in the vehicle up-down direction. Note that the lower end of the projection portion 50 includes a part of the lower edge of the lower back panel 16.

Figure 3:
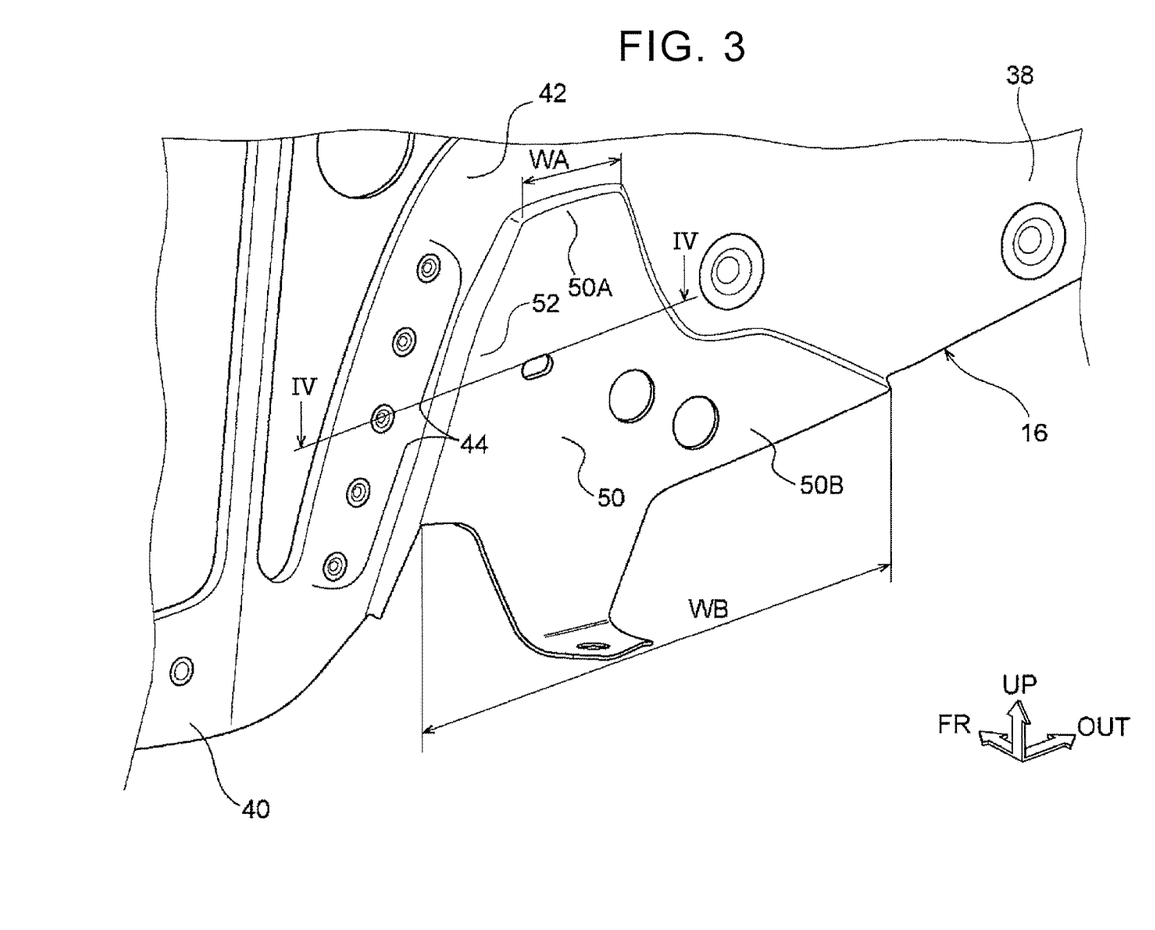
FIG. 3 is a perspective view illustrating a part in FIG. 1 in an enlarged manner.
Figure 4:
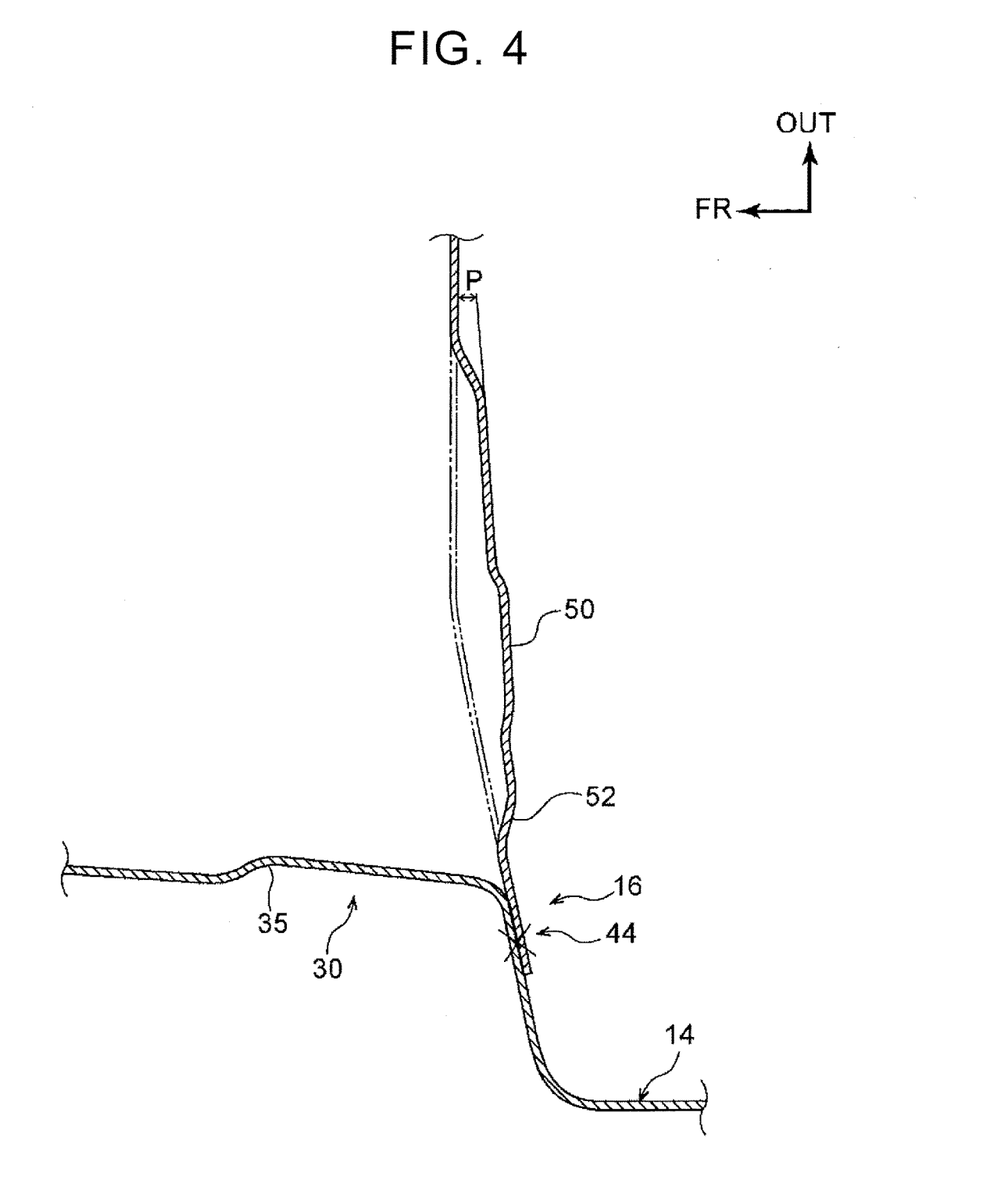
FIG. 4 is an enlarged sectional view taken along a line IV-IV in FIG. 3.

Further, an inner end 52 of the projection portion 50 in the vehicle width direction is inclined inwardly in the vehicle width direction as it goes downward in the vehicle up-down direction along the welding-spot portion 44 in the inclined wall portion 42. Note that, in the present embodiment, the projection portion 50 illustrated in FIG. 3 is configured such that the dimension WA of an upper side 50A in the vehicle width direction is set to about 27 mm, and the dimension WB of a lower side SOB in the vehicle width direction is set to about 150 mm, as an example. Further, the projection amount P of the projection portion 50 toward the rear side in the vehicle front-rear direction as illustrated in FIG. 4 is set to about 3 mm.

Figure 9:
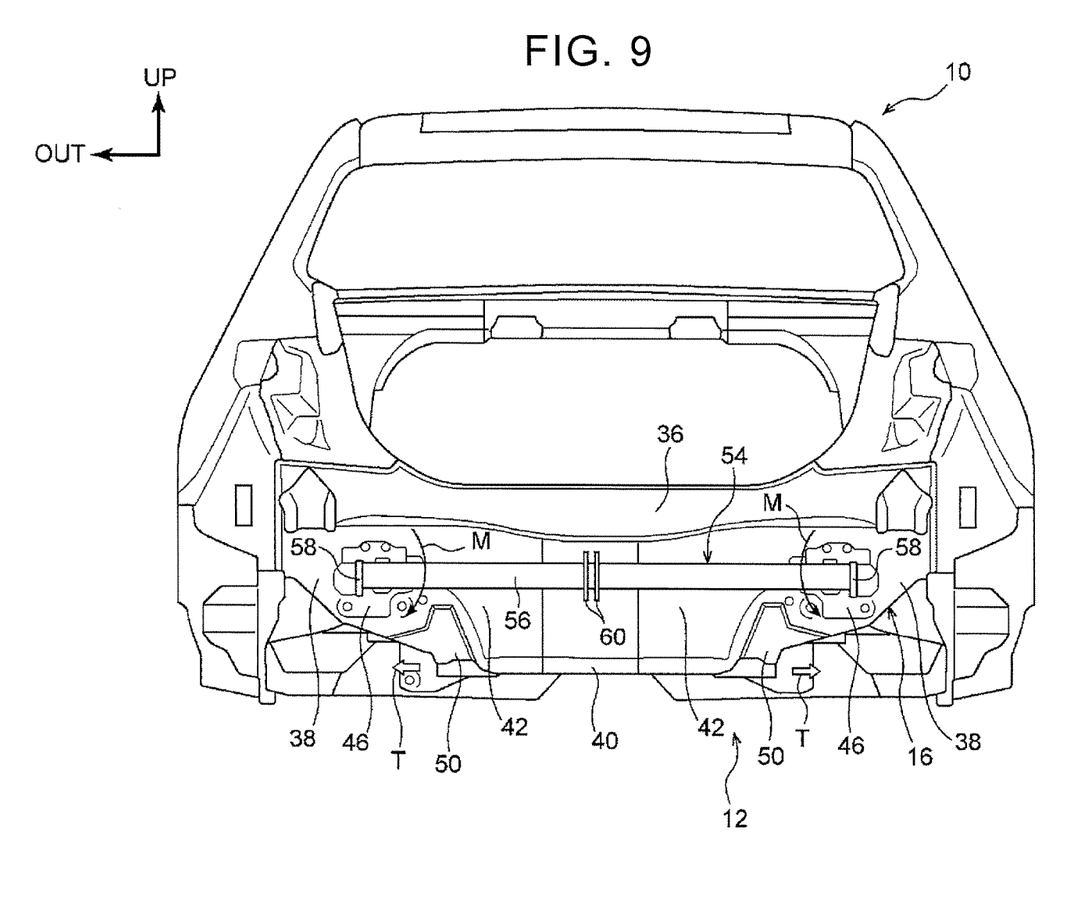
FIG. 9 is a rear view illustrating the vehicle rear portion having the vehicle rear structure according to the embodiment when viewed from the vehicle rear side.

As illustrated in FIG. 9, a towing hitch member 54 to be attached to the vehicle 10 includes a hitch member main body 56 and a pair of right and left connecting members 58. The hitch member main body 56 is formed generally in a rectangular column shape extending such that the longitudinal direction is along the vehicle width direction. A pair of plate-shaped brackets 60 is attached to the central part of the hitch member main body 56 in the vehicle width direction. Hitch pins (not shown) are attached to the plate-shaped brackets 60.

Figure 8:
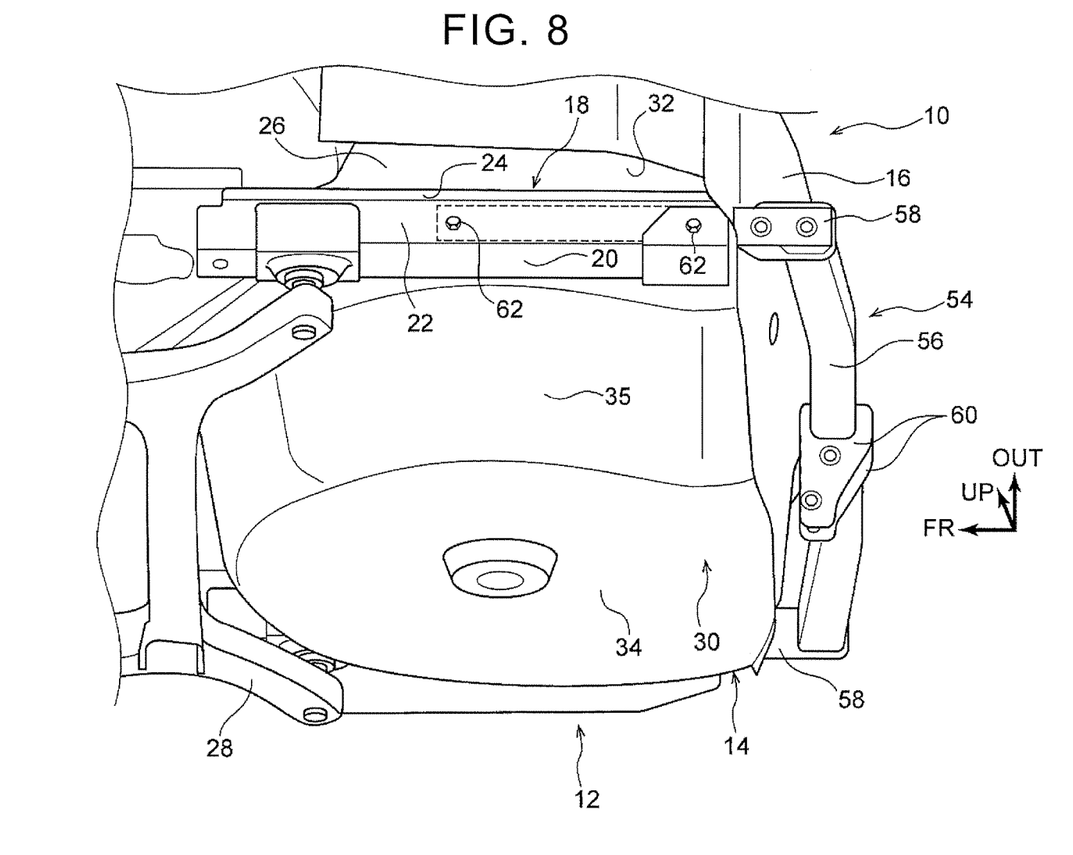
FIG. 8 is a perspective view illustrating the vehicle rear portion having the vehicle rear structure according to the embodiment when viewed from a diagonally lower side in the vehicle up-down direction.

Each of the connecting members 58 is attached to a corresponding one of the two ends of the hitch member main body 56 in the vehicle width direction. The connecting member 58 is formed generally in a rectangular plate shape with the longitudinal direction being along the vehicle front-rear direction and the plate-thickness direction being along the vehicle width direction, and projects toward the front side in the vehicle front-rear direction from the corresponding one of the two ends of the hitch member main body 56 in the vehicle width direction. Further, as illustrated in FIG. 8, the connecting member 58 is inserted into the through-hole 48 (see FIG. 5) in the lower back panel 16, and is fastened to the rear side member 18 with a fastener 62 inserted in a through-hole (not shown) formed in the outer side wall portion of the rear side member 18 in the vehicle width direction. That is, the towing hitch member 54 is configured so as not to be directly fixed to the lower back panel 16.

Next will be described operations and effects of the present embodiment.

In the present embodiment, as illustrated in FIG. 1, the lower back panel 16 is attached to the rear end of the rear floor pan 14 provided in the vehicle rear portion and to the rear ends of the right and left rear side members 18 each attached to a corresponding one of the two ends of the rear floor pan 14 in the vehicle width direction. Further, the lower back panel 16 includes: the through-holes 48 into which the connecting members 58 of the towing hitch member 54 attached to respective rear ends of the rear side members 18 are insertable; the offset portion 40 formed inwardly in the vehicle width direction compared with the rear side members 18 so as to be offset toward one side in the vehicle front-rear direction in the rear end of the rear floor pan 14; and the inclined wall portions 42 formed inwardly in the vehicle width direction compared with the rear side members 18 so as to connect the offset portion 40 to the general surfaces 38 as the parts other than the offset portion 40. The offset portion 40 projects in the same direction as a part of the rear end of the rear floor pan 14, the part being offset toward the one side in the vehicle front-rear direction. Further, the inclined wall portions 42 are provided with the welding-spot portions 44 to which the rear end of the rear floor pan 14 is partially welded.

Figure 6:
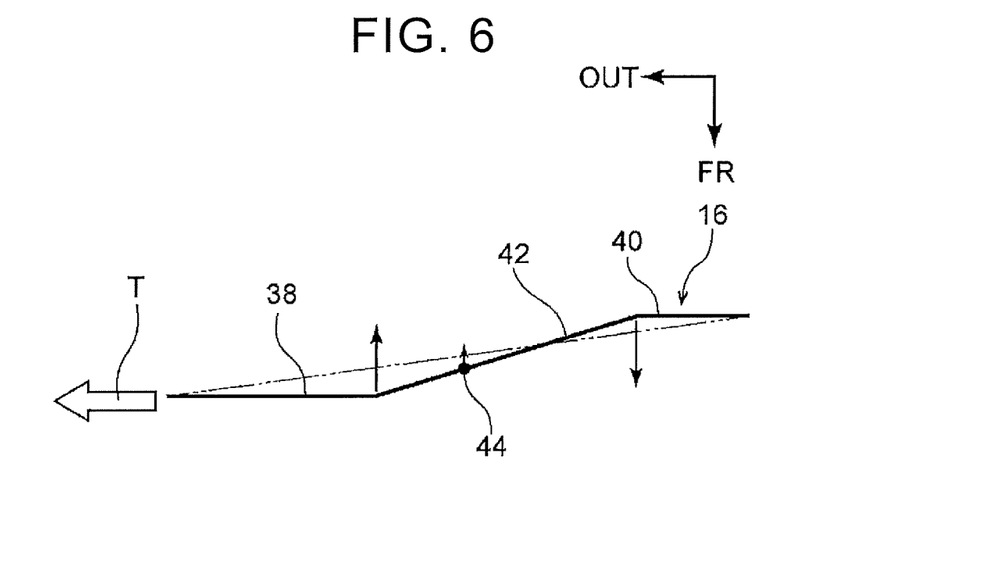
FIG. 6 is a schematic sectional view corresponding to a sectional view taken along a line VI-VI in FIG. 5 and illustrates a deformation state of a lower back panel having a vehicle rear structure according to a comparative example.
Figure 7:
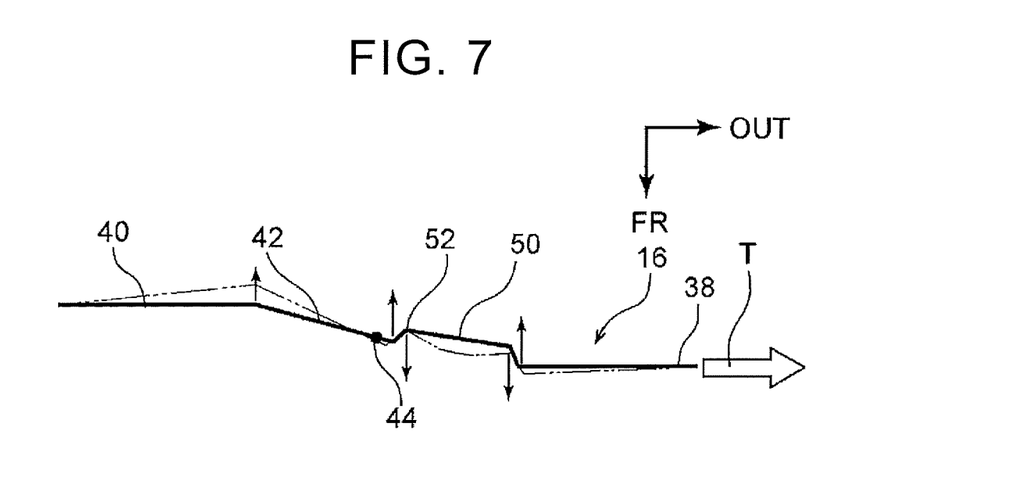
FIG. 7 is a schematic sectional view corresponding to a sectional view taken along a line VII-VII in FIG. 5 and illustrates a deformation state of the lower back panel having the vehicle rear structure according to the embodiment.

Here, when the towing hitch member 54 is attached to the rear side members 18 and a load directed downward in the vehicle up-down direction is input into the towing hitch member 54 from an object to be towed, rotational moments M (see FIG. 9), which displace the inner portions of the right and left rear side members 18 in the vehicle width direction to downward in the vehicle up-down direction with the rear side members 18 and the joining portions 46 as centers, are applied to the vehicle body. When the rotational moments M are applied to the vehicle body, tensile forces T (see FIG. 9) directed outwardly in the vehicle width direction are applied to the lower end of the lower back panel 16. In the meantime, as illustrated in FIG. 6, in the configuration where the projection portion 50 is not formed in the lower back panel 16, when the tensile force T directed outward in the vehicle width direction is applied to the lower back panel 16, the offset portion 40 is displaced to the opposite side (the front side in the vehicle front-rear direction) of the offset direction and the general surface 38 is displaced to the offset direction (the rear side in the vehicle front-rear direction, see the alternate long and two short dashes line in the figure). As a result, a stress concentrates on the welding-spot portion 44 in the inclined wall portion 42. On the other hand, as illustrated in FIG. 7, the projection portion 50 projecting in the same direction as the offset portion 40 is provided between the welding-spot portion 44 and the joining portion 46 to which the rear side member 18 is joined in the lower back panel 16 in the present embodiment. Accordingly, when the tensile force T is applied to the lower back panel 16, the projection portion 50 is extended by the tensile force T thus applied and is displaced toward the opposite side of the projecting direction, that is, toward the opposite side of the offset direction (see the alternate long and two short dashes line in the figure), so that the displacement of the part other than the offset portion 40 toward the offset direction is generally canceled. Hereby, the deformation of the whole lower back panel 16 in the vehicle front-rear direction is restrained, so that a stress toward the offset direction to be applied to the welding-spot portion 44 in the inclined wall portion 42 can be reduced. As a result, it is possible to restrain weight and cost and to also restrain the stress applied to the welding-spot portion 44 between the lower back panel 16 and the rear floor pan 14 at the time when a load is input from the towing hitch member 54.

Further, the projection portion 50 is provided at a position including a part of the lower edge of the lower back panel 16. That is, the projection portion 50 is provided in the lower edge of the lower back panel 16 on which the tensile force T directed outwardly in the vehicle width direction acts most when a load directed downwardly in the vehicle up-down direction is input into the towing hitch member 54 from an object to be towed. Accordingly, the stress toward the offset direction concentrates more on the welding-spot portion 44 in the inclined wall portion 42 near the lower edge of the lower back panel 16 in comparison with the part other than the welding-spot portion 44, but it is possible to more surely reduce the stress directed toward the offset direction and applied to the welding-spot portion 44 near the lower edge of the lower back panel 16 due to the displacement of the projection portion 50 provided at the position including a part of the lower edge of the lower back panel 16. As a result, it is possible to further restrain the stress applied to the welding-spot portion 44 between the lower back panel 16 and the rear floor pan 14 at the time when a load is input from the towing hitch member 54.

Further, the projection portion 50 is formed generally in a trapezoidal shape of which the width increases as it goes toward the lower side in the vehicle up-down direction in a rear view of the vehicle, and the lower end of the projection portion 50 is formed to include the region which is lower than the joining portion 46 between the lower back panel 16 and the rear side member 18 in the vehicle up-down direction. That is, the upper end of the projection portion 50 is placed between the welding-spot portion 44 of the inclined wall portion 42 and the joining portion 46 to which the rear side member 18 is joined in the lower back panel 16 and the lower end of the projection portion 50 is formed to include the region which is lower than the joining portion 46 to which the rear side member 18 is joined in the vehicle up-down direction, thereby making it possible to increase a region where the projection portion 50 is formed. Accordingly, a range where the projection portion 50 is displaced, by the tensile force T applied thereto, toward the opposite side of the projecting direction, that is, toward the opposite side from the offset direction can be made large, thereby making it possible to reduce the stress toward the offset direction to be applied to the welding-spot portion 44 in the lower back panel 16 over a wide range. As a result, it is possible to restrain, in a wide range, the stress applied to the welding-spot portion 44 between the lower back panel 16 and the rear floor pan 14 at the time when a load is input from the towing hitch member 54.

Note that, in the embodiment, as illustrated in FIG. 2, the rear end of the floor pan bottom wall portion 34 in the rear floor pan 14 is offset rearward in the vehicle front-rear direction from the rear end of the general portion 32 in the rear floor pan 14 so that the flange of the rear end does not break at the time of deep draw forming. However, the present disclosure is not limited to this, and the rear end of the floor pan bottom wall portion 34 may be offset forward in the vehicle front-rear direction. In this case, it is preferable that the offset portion 40 and the projection portion 50 in the lower back panel 16 have such a configuration that they are offset (projected) forward in the vehicle front-rear direction so as to correspond to the rear end of the floor pan bottom wall portion 34.

Further, the projection portion 50 is formed generally in a trapezoidal shape in a rear view of the vehicle. However, the present disclosure is not limited to this, and the projection portion 50 may be formed in other shapes such as a rectangular shape.

Further, the projection portion 50 is provided at the position including a part of the lower edge of the lower back panel 16. However, the present disclosure is not limited to this, and the projection portion 50 may be provided at a position that does not include a part of the lower edge of the lower back panel 16.

Furthermore, the welding-spot portion 44 is provided in a part of the inclined wall portion 42 near the general surface 38 (a part of the inclined wall portion 42 which part is placed outwardly in the vehicle width direction compared with the center of the inclined wall portion 42 in the vehicle width direction). However, the present disclosure is not limited to this. When the projection portion 50 is provided, the deformation of the whole lower back panel 16 in the vehicle front-rear direction is restrained. Accordingly, the welding-spot portion 44 may be provided in other parts in the inclined wall portion 42.

The embodiment of the present disclosure has been described above, but the present disclosure is not limited to the above description and may be modified in various ways to be performed as long as the modifications are not beyond the gist thereof.

What is claimed is:

1. A vehicle rear structure comprising:
   a projection portion; and
   a lower back panel joined to a rear end of a rear floor pan provided in a vehicle rear portion and rear ends of a pair of rear side members, each of the rear side members attached to a corresponding one of two ends of the rear floor pan in a vehicle width direction, the lower back panel having:
      a through-hole into which a connecting member of a towing hitch member is able to be inserted, the towing hitch member being attached to the rear side members;
      a first offset portion formed inwardly in the vehicle width direction from the rear side members and offset toward an offset side, the offset side being one side in a vehicle front-rear direction;
      an inclined wall portion formed inwardly in the vehicle width direction compared with a corresponding one of the rear side members, the inclined wall portion being configured to connect the first offset portion to a general part, the general part being a part other than the first offset portion and the inclined wall portion in the lower back panel; and
      a welding-spot portion provided in the inclined wall portion, the welding-spot portion being welded to a part of the rear end of the rear floor pan, wherein:
   the projection portion is provided between the welding-spot portion and a joining portion of the lower back panel;
   the projection portion projects towards the offset side; and
   the joining portion is a part where the lower back panel is joined to one of the rear side members.

2. The vehicle rear structure according to claim 1, wherein:
   the first offset portion is offset toward the offset side so as to correspond to a second offset portion which is offset toward the offset side; and
   the second offset portion is a part of the rear end of the rear floor pan, which is offset toward the offset side.

3. The vehicle rear structure according to claim 1, wherein the projection portion is provided at a position including a part of a lower edge of the lower back panel.

4. The vehicle rear structure according claim 1, wherein:
   the projection portion has a generally trapezoidal shape increased in width toward a lower side in a vehicle up-down direction; and
   a lower end of the projection portion is placed to be lower than the joining portion in the vehicle up-down direction.

* * * * *